US008696908B2

(12) United States Patent
MacLaggan

(10) Patent No.: US 8,696,908 B2
(45) Date of Patent: Apr. 15, 2014

(54) DESALINATION SYSTEM AND METHOD OF WASTEWATER TREATMENT

(75) Inventor: Peter MacLaggan, San Diego, CA (US)

(73) Assignee: Poseidon Resources IP LLC, Huntington Beach, CA (US)

(*) Notice: Subject to any disclaimer, the term of this patent is extended or adjusted under 35 U.S.C. 154(b) by 525 days.

(21) Appl. No.: 12/779,778

(22) Filed: May 13, 2010

(65) Prior Publication Data
US 2010/0314313 A1    Dec. 16, 2010

Related U.S. Application Data

(60) Provisional application No. 61/177,856, filed on May 13, 2009.

(51) Int. Cl.
| | | |
|---|---|---|
| *C02F 1/04* | (2006.01) | |
| *C02F 1/44* | (2006.01) | |
| *C02F 1/16* | (2006.01) | |
| *B01D 61/02* | (2006.01) | |
| *C02F 103/08* | (2006.01) | |

(52) U.S. Cl.
CPC . *C02F 1/04* (2013.01); *C02F 1/441* (2013.01); *C02F 2103/08* (2013.01); *C02F 1/16* (2013.01); *B01D 61/025* (2013.01)
USPC ........................... 210/631; 210/251; 210/542

(58) Field of Classification Search
CPC ........ C02F 2103/08; C02F 1/441; C02F 1/04; C02F 1/16; B01D 61/025
USPC .................. 210/600, 601, 631, 747, 251, 542
See application file for complete search history.

(56) References Cited

U.S. PATENT DOCUMENTS

| | | | |
|---|---|---|---|
| 3,352,107 A | 11/1967 | Blaskowski | |
| 3,671,404 A | 6/1972 | Meckler | |
| 4,009,082 A | 2/1977 | Smith | |
| 4,083,781 A | 4/1978 | Conger | |
| 4,141,825 A | 2/1979 | Conger | |
| 4,156,645 A | 5/1979 | Bray | |
| 4,161,445 A | 7/1979 | Coillet | |
| 4,169,789 A | 10/1979 | Lerat | |
| 4,347,704 A | 9/1982 | Marquardt et al. | |

(Continued)

FOREIGN PATENT DOCUMENTS

| | | |
|---|---|---|
| IL | 67054 A | 3/1989 |
| WO | WO 97/18166 A2 | 5/1997 |
| WO | WO 2006/106158 A1 | 10/2006 |

OTHER PUBLICATIONS

Mickley and Associates (2001), "Membrane Concentrate Disposal: Practices and Regulation" U.S. Department of the Interior, Bureau of Reclamation, Technical Services Center, Desalination and Water Purification Research and Development Program Report No. 69.

(Continued)

*Primary Examiner* — Chester Barry
(74) *Attorney, Agent, or Firm* — Dickstein Shapiro, LLP

(57) ABSTRACT

Various embodiments described herein provide methods and apparatus for releasing treated wastewater into the environment by combining the treated wastewater with a concentrated salty water before discharging the combined water into the environment. The treated wastewater and concentrated salty water may be combined in a ratio that will be less toxic to at least some resident marine life than the treated wastewater alone.

27 Claims, 4 Drawing Sheets

(56) References Cited

U.S. PATENT DOCUMENTS

| | | |
|---|---|---|
| 4,354,939 A | 10/1982 | Pohl |
| 4,434,057 A | 2/1984 | Marquardt |
| 4,765,514 A | 8/1988 | Berglund |
| 5,076,934 A | 12/1991 | Fenton |
| 5,098,575 A | 3/1992 | Yaeli |
| 5,128,042 A | 7/1992 | Fenton |
| 5,238,574 A | 8/1993 | Kawashima et al. |
| 5,329,798 A | 7/1994 | Takakura et al. |
| 5,346,592 A | 9/1994 | Madani |
| 5,547,584 A | 8/1996 | Capehart |
| 5,622,605 A | 4/1997 | Simpson et al. |
| 5,645,693 A | 7/1997 | Gode |
| 5,651,894 A | 7/1997 | Boyce et al. |
| 5,814,224 A | 9/1998 | Khamizov et al. |
| 5,980,716 A | 11/1999 | Horinouchi et al. |
| 6,083,382 A | 7/2000 | Bird |
| 6,100,600 A | 8/2000 | Pflanz |
| 6,126,834 A | 10/2000 | Tonelli et al. |
| 6,183,646 B1 | 2/2001 | Williams et al. |
| 6,187,200 B1 | 2/2001 | Yamamura et al. |
| 6,190,556 B1 | 2/2001 | Uhlinger |
| 6,190,558 B1 | 2/2001 | Robbins |
| 6,254,734 B1 | 7/2001 | Sephton |
| 6,299,766 B1 | 10/2001 | Permar |
| 6,306,291 B1 | 10/2001 | Lueck |
| 6,468,431 B1 | 10/2002 | Oklelas, Jr. |
| 6,508,936 B1 | 1/2003 | Hassan |
| 6,647,717 B2 | 11/2003 | Zaslavsky et al. |
| 6,679,988 B2 | 1/2004 | Gsell |
| 6,783,682 B1 | 8/2004 | Awerbuch |
| 6,833,056 B1 | 12/2004 | Kamiya et al. |
| 6,905,604 B2 | 6/2005 | Taber |
| 6,946,081 B2 | 9/2005 | Voutchkov |
| 7,037,430 B2 | 5/2006 | Donaldson et al. |
| 7,077,962 B2 | 7/2006 | Pipes |
| 7,081,205 B2 | 7/2006 | Gordon et al. |
| 7,083,730 B2 | 8/2006 | Davis |
| 7,118,307 B2 | 10/2006 | Stoecker et al. |
| 7,128,310 B2 | 10/2006 | Mockry et al. |
| 7,178,337 B2 | 2/2007 | Pflanz |
| 7,225,620 B2 | 6/2007 | Klausner et al. |
| 7,239,037 B2 | 7/2007 | Alstot et al. |
| 7,329,962 B2 | 2/2008 | Alstot et al. |
| 7,416,666 B2 | 8/2008 | Gordon |
| 7,455,778 B2 | 11/2008 | Gordon |
| 7,501,064 B2 | 3/2009 | Schmidt et al. |
| 7,746,323 B1 | 6/2010 | Otsuki et al. |
| 7,749,386 B2 | 7/2010 | Voutchkov |
| 8,206,589 B2 | 6/2012 | Voutchkov |
| 2003/0230534 A1* | 12/2003 | Donaldson et al. ............ 210/652 |
| 2005/0029192 A1 | 2/2005 | Arnold et al. |
| 2009/0090676 A1* | 4/2009 | Johnson ........................ 210/747 |
| 2009/0114603 A1* | 5/2009 | Gordon ......................... 210/747 |
| 2011/0017666 A1 | 1/2011 | Cath et al. |
| 2013/0087501 A1* | 4/2013 | Moe et al. ..................... 210/652 |

OTHER PUBLICATIONS

N. Voutchkov, "Novel Method for Assessing Salinity Tolerance of Marine Organisms" Environment Engineer: Applied Research and Practice, Summer 2007, vol. 3, pp. 24-28, American Academy of Environmental Engineers.

M. Mickley, "Major Ion Toxicity in Membrane Concentrate" AWWA Research Foundation and American Water Works Association, 2000.

Mushtaque Ahmed et al., "Use of Evaporation Ponds for Brine Disposal in Desalination Plants," Desalination 130 (2000), pp. 155-168.

Robert R. Yamada, et al., "Co-Located Seawater Desalination/Power Facilities: Practical and Institutional Issues," Desalination 102 (1995), pp. 279-286.

\* cited by examiner

DESALINATION SYSTEM AND METHOD OF WASTEWATER TREATMENT

CROSS-REFERENCE TO RELATED APPLICATIONS

This application claims the benefit of U.S. provisional application 61/177,856, filed on May 13, 2009, the subject matter of which is incorporated by reference herein in its entirety.

BACKGROUND

Embodiments described herein relate generally to improved systems and methods for the desalination of seawater and, more particularly, to methods and apparatus for the treatment and disposal of wastewater having a relatively low salt concentration and concentrate (brine) generated from desalination plants having a relatively high salt concentration.

The desire to make drinkable, potable water out of seawater has existed for a long time. Several approaches can be taken to remove the salt and other chemicals. One approach to desalination is reverse osmosis. This method uses pressure to force salty feed water against membranes which allows the relatively salt free water to pass through, but not much of the salts or other minerals, to create a concentrate (brine) and a permeate. Desalination systems are disclosed in U.S. Pat. No. 6,946,081, and U.S. application Ser. No. 12/424,125, the disclosures of which are incorporated by reference herein in their entirety. The permeate from the desalination plant may be used as potable water for home use, agriculture, or industry. The concentrate must be properly disposed of, often by discharge to a body of water, such as an ocean, sea, or other body of salty water. However, the discharge of concentrated seawater from a desalination facility into a natural environment of water having a lower concentration of salts and minerals may harm organisms or otherwise damage the natural environment.

Similarly, wastewater having a relatively low salt concentration from other water treatment processes are also disposed of by discharge into bodies of salty water. The discharge of fresh water or water having a relatively low salt concentration into a natural environment of water having a higher concentration of salts and minerals may harm organisms or otherwise damage the natural environment. For example, the city of San Jose, Calif. limits the flow of treated municipal and industrial wastewater, into the south end of San Francisco Bay because too much of such low salt concentration wastewater could convert the salt marsh located there into a brackish marsh, endangering the resident animal and plant life.

Thus, there is a need for methods and apparatus to properly dispose of concentrate from a water desalination plant and treated wastewater from a waste treatment plant into surface bodies of water or otherwise without causing environmental damage.

SUMMARY

Various embodiments described herein provide methods and apparatus for combining concentrated seawater by-product of a desalination plant with treated municipal and industrial wastewater produced by a wastewater treatment plant in proportions required to maintain a desired salinity of the discharge. In an embodiment described herein, a method for disposing of concentrated by-product of the desalination process includes mixing treated wastewater and salty water concentrate to produce a combined discharge with the appropriate mix of salts and minerals to more closely match the water quality character of the receiving water.

In another embodiment, a method for releasing water into the environment includes the steps of obtaining concentrate from a water desalination plant by desalinating salty water, obtaining treated wastewater from a wastewater treatment plant, combining the concentrate and treated wastewater, and releasing the combined concentrate and treated wastewater into a body of water. In one embodiment, the combined concentrate and treated wastewater has a salinity such that the combined concentrate and treated wastewater is less harmful to the environment of the body of water.

In another embodiment, a mixer for combining wastewater and salty water concentrate includes a first input coupled to a source of treated wastewater, a second input coupled to a source of salty water concentrate, and an output coupled to a body of salty water. In various embodiments, the source of treated wastewater is a wastewater treatment plant, the source of salty water concentrate is a water distillation plant, and/or the body of salty water is an ocean.

In yet another embodiment, a system for disposing of treated wastewater includes a mixer for mixing a concentrated salty water and a treated wastewater, a salty water desalination plant, and a wastewater treatment plant. The salty water desalination plant includes an input coupled to a source of salty water, a desalination unit for desalinating the salty water to produce a permeate having a lower salt concentration than the salty water and a concentrate having a higher salt concentration than the salty water, and an output coupled to the mixer for outputting at least a portion of the concentrate to the mixer. The wastewater treatment plant includes an input coupled to a source of wastewater, a wastewater treatment process, and an output coupled to the mixer.

These and other features and advantages of the invention will be more clearly understood from the following detailed description and drawing of an embodiment of the present invention.

DETAILED DESCRIPTION OF PREFERRED EMBODIMENTS

Figure 1:
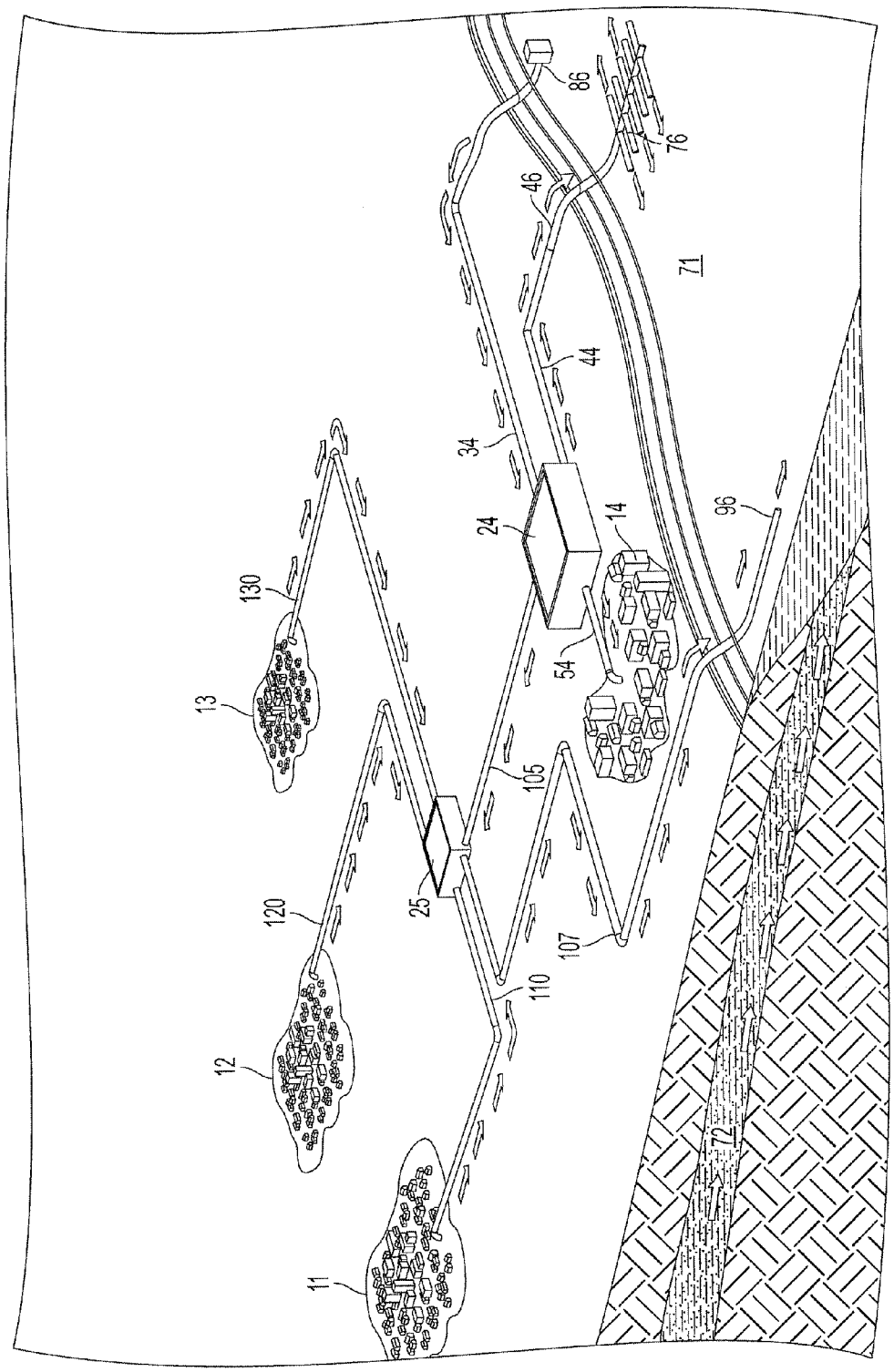
FIG. 1 is a schematic illustration of a desalination system and wastewater treatment system according to an embodiment described herein.

FIG. 1 is a diagram of a desalination system and wastewater treatment system according to another embodiment described herein. As shown in FIG. 1, a wastewater treatment plant 25 receives wastewater, such as industrial waste or municipal waste, from one or more municipalities 11, 12, 13 or other locations through various incoming pipes 110, 120, 130. The wastewater treatment plant 25 treats the wastewater and releases the treated wastewater through a pipe 107 and discharge 96 into the ocean 71. Alternatively, the wastewater may be discharged into another body of water, such as a river, bay, harbor, estuary, salt marsh, underground aquifer, or other body of water. The treated wastewater generally has a lower salt concentration than the ocean 71 into which the treated wastewater is released. If too much low salt concentration water is released, the environment of the ocean 71 in the vicinity of the discharge 96 may be altered to the detriment of resident marine life. "Resident marine life" is defined herein as being aquatic plant and animal species that inhabit the body of water into which the treated wastewater is discharged and that are desired to be protected by applicable laws and/or regulations or by the person using the system or the process of the claimed subject matter.

To increase the salt concentration of the discharged wastewater, seawater concentrate from the seawater desalination plant 24 may be sent to the wastewater treatment plant 25 via pipe 105 and mixed with the treated wastewater before discharging the treated wastewater. In other embodiments, various combinations of seawater concentrate and seawater may be sent to the wastewater treatment plant 25 from the seawater desalination plant 24 via pipe 105 and mixed with the treated wastewater. In another embodiment, seawater alone may be used as a source of salt water to be mixed with the treated wastewater.

The seawater desalination plant 24 receives seawater to be desalinated from the ocean, bay, or estuary 71 through in inlet 86 connected to pipes and pumps 34. In one embodiment, the seawater may be provided from a power plant (not shown) located near the seawater desalination plant as described in further detail in U.S. Pat. No. 6,946,081. In another embodiment, seawater or brackish water may be provided from dewatering pumps at a subsurface parking structure, such as a garage (not shown). A portion or all of the seawater or brackish water extracted from underneath the parking structure may bypass the wastewater treatment plant 25 and be sent directly to the desalination plant by a diverting series of pipes.

The seawater desalination plant 24 may desalinate the seawater to produce a permeate having a salt concentration lower than that of the seawater and a concentrate having a salt concentration higher than that of the seawater. The seawater desalination plant 24 may desalinate the seawater using a reverse osmosis method, a membrane softening method, an electrodialysis desalination method, an electrodialysis reversal method, a distillation method, or some combination thereof. The permeate may be sent to one or more municipalities 11, 12, 13, 14 via pipe 54 and/or other pipes (not shown) for use as potable water or may be used for agriculture or industry. A portion of the concentrate may be output from the seawater desalination plant 24 via a series of pipes and pumps 44 and may be disposed of to the ocean using the pipes 46 and outlet 76. In another embodiment, some or all of the concentrate may be sent to the wastewater treatment plant 25 via pipe 105. The desalination plant 24 may be located remotely from or near to the wastewater plant 25 and/or the ocean 71, and may share discharge facilities.

Figure 2:
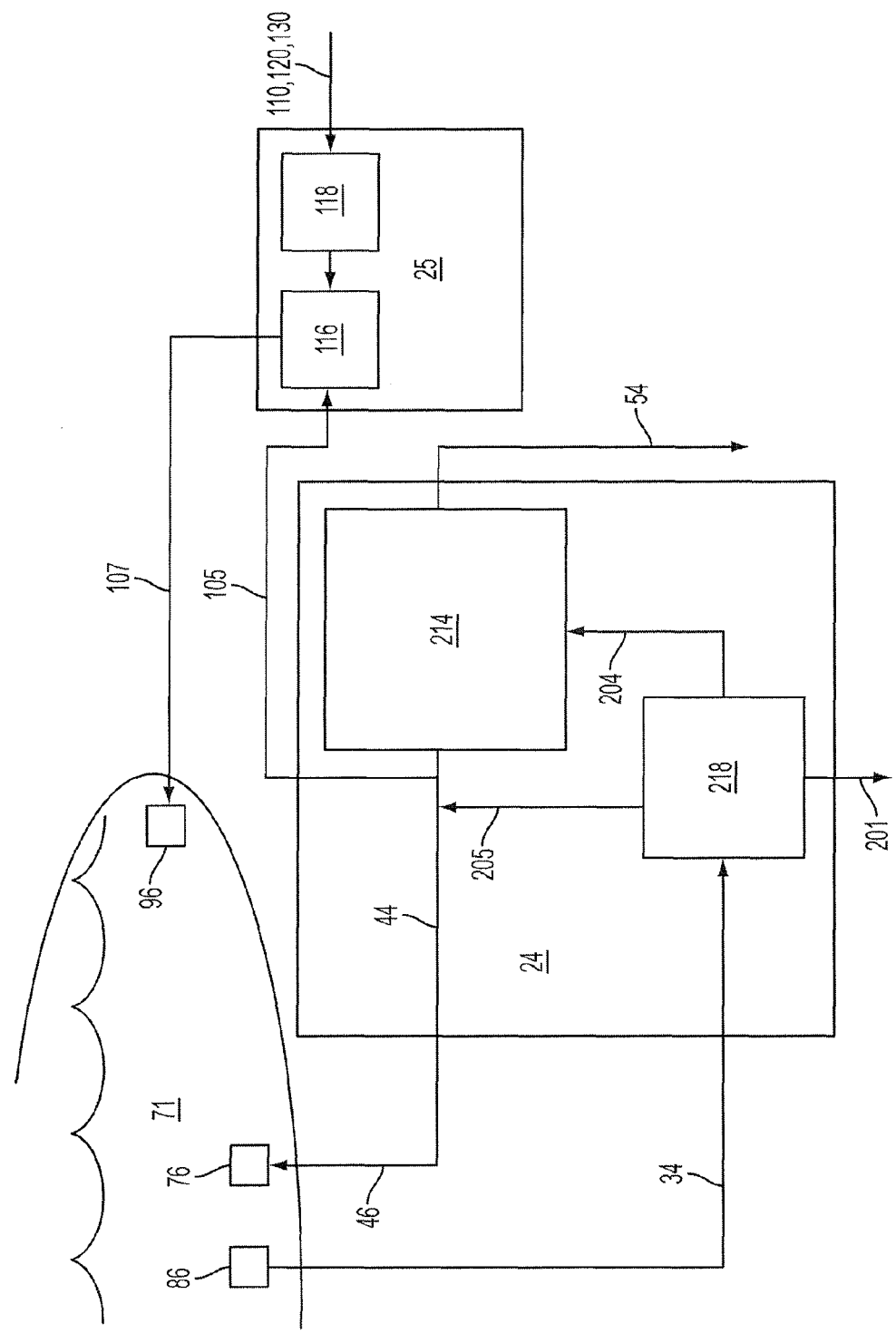
FIG. 2 is a diagram of a desalination system and wastewater treatment system according to another, embodiment described herein.

FIG. 2 is a diagram of a desalination system and wastewater treatment system according to another embodiment described below. As shown in FIG. 2, seawater is drawn from the ocean 71 through an inlet 86 located in the ocean, bay, or estuary 71 and conveyed to the seawater desalination plant 24 by input pipes and pumps 34. The seawater enters a pretreatment process 218 wherein the seawater undergoes an initial filtering process. In this step, the seawater is separated into solids, usable water, and unusable water. Unusable water leaves the pretreatment process 218 and is discharged through a pretreatment unusable water line 205. Solids that result from the pretreatment process 218 may be delivered to landfill through a pretreatment solid waste line 201. The remaining usable seawater leaves through a filtered feed water line 204 and is sent to the desalination unit 214.

In the desalination unit 214, the seawater is separated into a permeate and a concentrate. The desalination unit may include a reverse osmosis system, a membrane softening system, an electrodialysis desalination system, an electrodialysis reversal system, a distillation system, or some combination thereof. The permeate may be output through line 54. A portion of the concentrate may be output from the seawater desalination plant 24 through line 44 and may be disposed of to the ocean using the pipes 46 and outlet 76.

All or only a portion of the concentrate may be sent to the wastewater treatment plant 25 via pipe 105. In other embodiments, a mixed seawater and seawater concentrate or seawater alone may be sent to the wastewater treatment plant 25. Wastewater from municipalities 11, 12, 13 or other locations is sent to the wastewater treatment plant via pipes 110, 120, 130. The wastewater is treated in one or more wastewater treatment units 118, which may include methods such as screening, sedimentation, activated sludge, surface-aerated basins, filter beds, oxidizing beds, biological aerated filters, membrane bioreactors, rotating biological contactors, filtration, lagooning, nutrient removal, nitrogen removal, phosphorus removal, disinfection, and the like. The treated wastewater may then be sent to a mixing location 116 where it is mixed with the seawater concentrate and/or seawater from the seawater desalination plant 24 to produce a mixed wastewater. Mixing location 116 may be located at a wastewater treatment plant 25 or other locations along the treated wastewater discharge pipeline 107. The mixed municipal wastewater and seawater concentrate may then be disposed of though pipe 107 to outlet 96 located in the ocean 71 or other body of water. In another embodiment, the wastewater plant 25 and the seawater desalination plant 24 may share an outlet 76 and/or outlet 96.

The ratio of concentrate to treated wastewater may be varied in order to obtain a total dissolved solids (TDS) concentration sufficient so as not to harm, or to reduce the harm to the environment of the ocean 71 or other body of water into which the mixed wastewater is disposed. Combining concentrate and/or seawater and treated wastewater may be accomplished by using a proportioning mechanism to control the ratio of concentrate to treated wastewater. Additionally, any other suitable proportioning mechanism may be employed. The proportioning may be manually or automatically controlled.

The mixing ratio of the concentrate to wastewater depends on a number of factors, including the total dissolved solids ("TDS") concentrations of the wastewater and the concentrate. One mechanism by which the concentrate renders the wastewater non-toxic is a balance of the ratios of one or more key ions (calcium, magnesium, fluoride, strontium, sodium, chloride, potassium, sulfates, and bicarbonates) and the total dissolved solids (TDS) concentration of the concentrate (ion/TDS ratio) in the combined concentrate and wastewater mixture. If the ion/TDS ratio for one or more of these key ions contained in the combined concentrate and wastewater mixture is above a certain threshold value, the concentrate exhibits toxicity to marine life in the vicinity of the discharge. If the ion/TDS ratio is lowered below a certain level by increasing the salinity of the mixture, the effects of the combined wastewater and concentrate on the environment will be reduced and the discharge of the combined wastewater and concentrate may comply with environmental regulations. Furthermore, the combined wastewater and concentrate may be made less toxic or non-toxic to at least some resident marine life.

Figure 3:
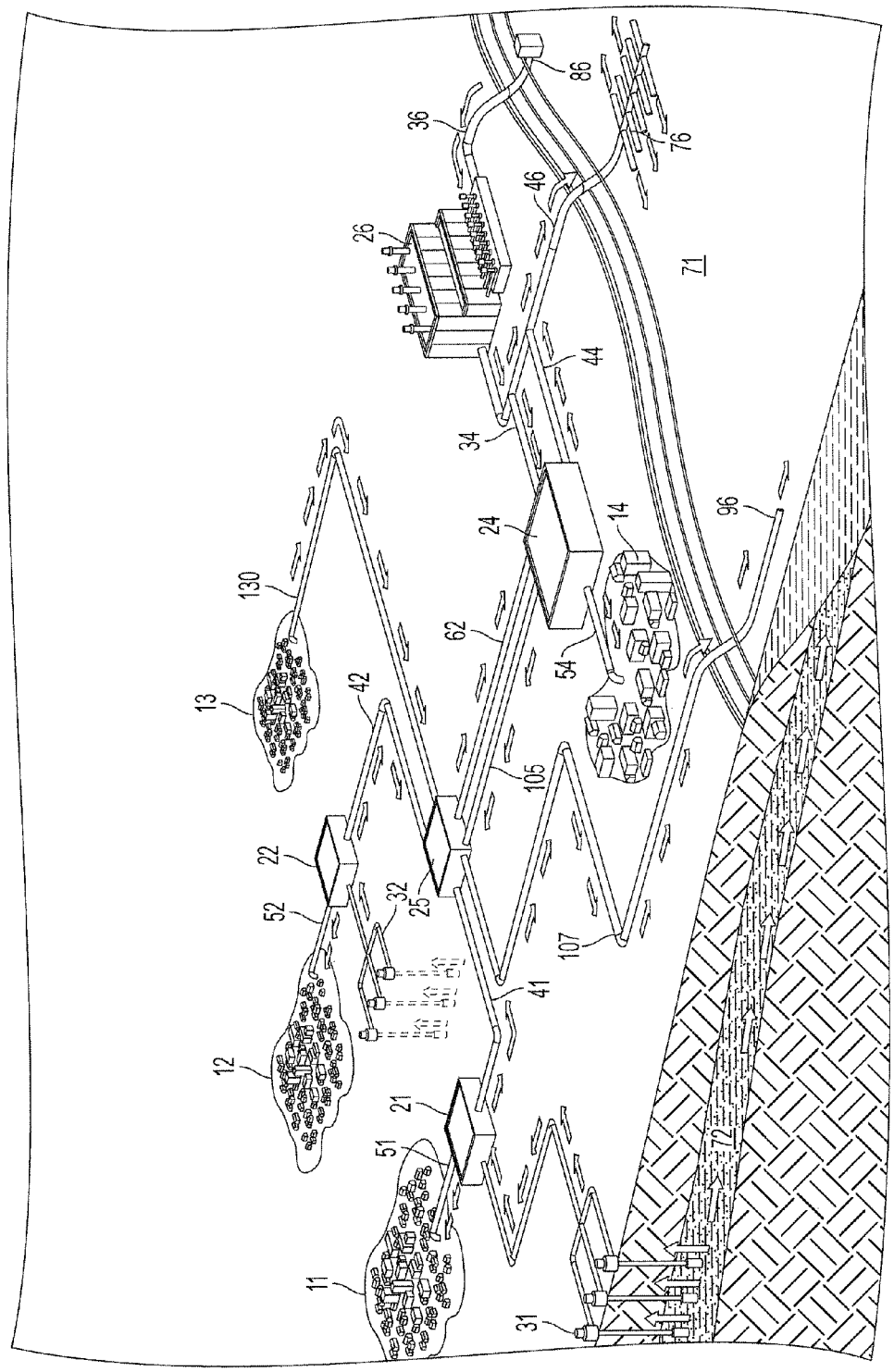
FIG. 3 is a schematic illustration of a desalination system and wastewater treatment system according to another embodiment described herein.

FIG. 3 is a diagram of a desalination system and wastewater treatment system according to another embodiment described herein. With reference to FIG. 3, a wastewater treatment plant 25 receives wastewater, such as sewer water, industrial waste, or agricultural waste, from a municipality 13 or other location through a pipe 130. In other embodiments, the wastewater treatment plant 25 may receive wastewater from more than one municipality 11, 12, 13 or location. As described in further detail in U.S. patent application Ser. No. 12/424,125, filed Apr. 15, 2009, the disclosure of which is incorporated herein in its entirety, the wastewater treatment plant may also receive brackish concentrate through pipes 41, 42 from brackish desalination plants 21, 22. The wastewater treatment plant 25 treats the wastewater and releases the treated wastewater through a pipe 107 and discharge 96 into the ocean 71 or other body of water. As described above with respect to FIG. 1, the treated wastewater generally has a lower salt concentration than the ocean 71 into which the treated wastewater is released. If too much low salt concentration water is released, the environment of location 71 may be altered to the detriment of resident plant and animal life.

To increase the salt concentration of the discharged wastewater, seawater concentrate from the seawater desalination plant 24 may be sent to the wastewater treatment plant 25 via pipe 105 and mixed with the treated wastewater before discharging the treated wastewater. In other embodiments, various combinations of waters, such as seawater concentrate, brackish concentrate, and seawater, may be sent to the wastewater treatment plant 25 from the brackish plants 21, 22 via pipelines 41, 42 and the seawater desalination plant 24 via pipe 105 and mixed with the treated wastewater. In another embodiment, brackish concentrate directly from the brackish desalination plants 21, 22 may be used as a source of salt water to be mixed with the treated wastewater with or without water from the seawater desalination plant 24.

Figure 4:
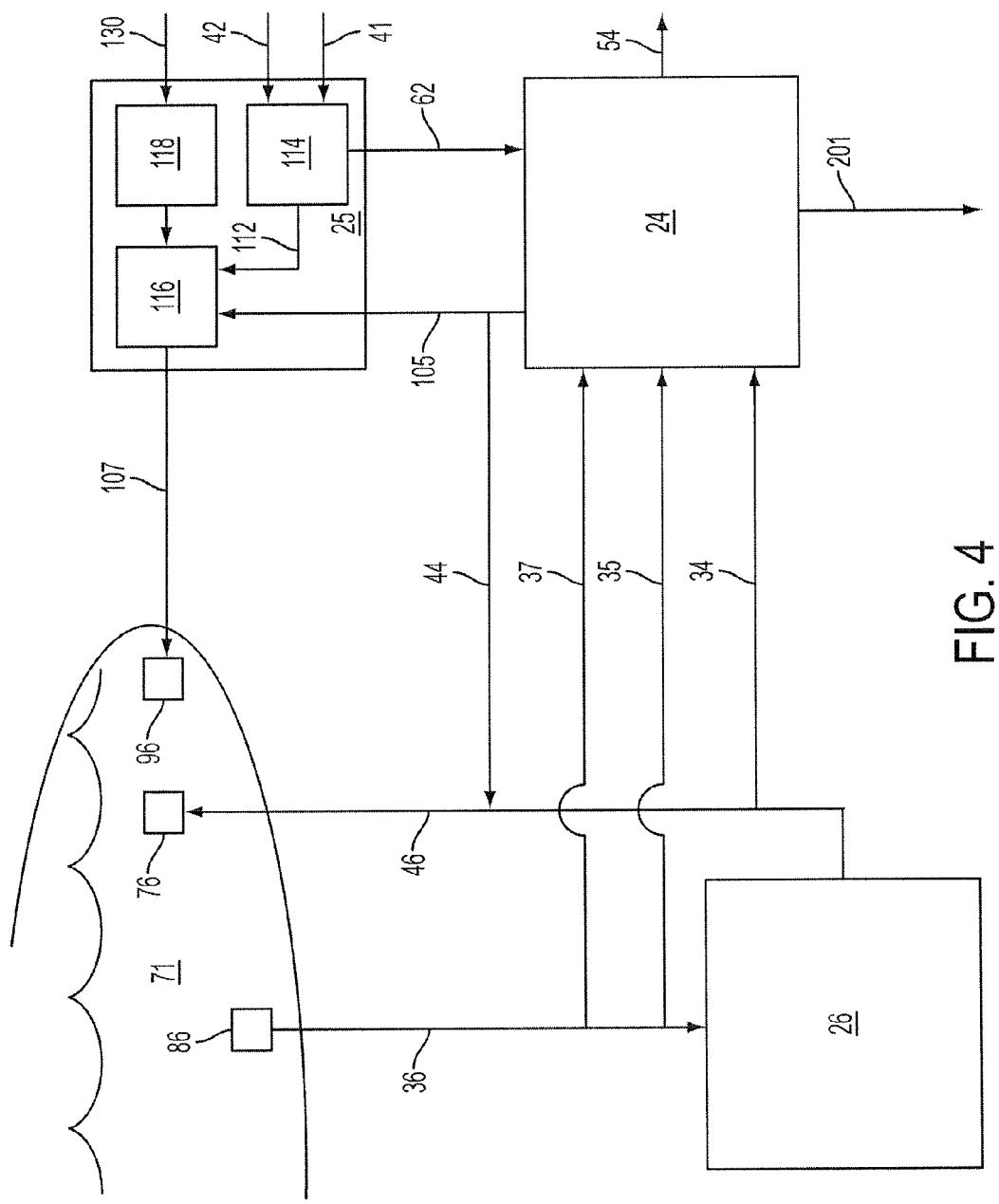
FIG. 4 is a diagram of a desalination system and wastewater treatment system according to another embodiment described herein.

As shown in FIG. 3, the seawater desalination plant 24 receives the brackish concentrate from the brackish desalination plants 21, 22 and receives seawater from the ocean 71. In one embodiment, the seawater may be provided from a power plant 26 located near the seawater desalination plant via a system of pipes and pumps 46 exiting the power plant 26. The power plant 26 may draw the seawater through an inlet 86 located in the ocean, bay, or estuary 71 and convey the seawater to the power plant 26 by input pipes and pumps 36. The power plant 26 may then use the seawater in a cooling system or other process to raise the seawater above ambient temperature using waste heat before providing the seawater to the seawater desalination plant 24 through a series of pipes and pumps 34. The waste heat from the power plant 26 may save energy by raising the temperature of the seawater to a desirable temperature without expending additional energy by the seawater desalination plant 24. In another embodiment, a portion or all of the seawater may bypass the power plant 26 and be sent directly to the desalination plant 24 by a diverting series of pipes 35 (FIG. 4). In yet another embodiment, the seawater desalination plant 24 may obtain seawater through its own independent inlet (not shown) not connected to a power plant 26. Seawater used by the power plant 26 and not sent to the seawater desalination plant 24 may be returned to the ocean 71 by a series of pipes and pumps 46 to an outlet 76 or series of dispersing outlets located in the ocean 71.

The seawater and the brackish concentrate are received by and mixed at the seawater desalination plant 24 to produce a mixed water. In other embodiments, the brackish concentrate and seawater may be mixed at other convenient locations and the mixed water may be supplied to the seawater desalination plant 24. The seawater desalination plant 24 may desalinate the mixed water to produce a permeate having a salt concentration lower than that of the mixed water and a concentrate having a salt concentration higher than that of the mixed water. The seawater desalination plant 24 may desalinate the mixed water using a reverse osmosis method, a membrane softening method, an electrodialysis desalination method, an electrodialysis reversal method, a distillation method, or some combination thereof. The permeate may be sent to a municipality 14 via a series of pumps and pipes 54 for use as potable water or may be used for agriculture or industry. A portion of the mixed concentrate may be output from the seawater desalination plant 24 via a series of pipes and pumps 44 and may be disposed of to the ocean using the pipes 46 and outlet 76 of the power plant 26. In another embodiment, the mixed concentrate may be output to an outlet 76 not connected to a power plant 26 (not shown). Another portion or, in another embodiment, all of the concentrate may be sent to the wastewater treatment plant 25 via pipe 105.

FIG. 4 is a diagram of a desalination system and wastewater treatment system according to another embodiment described below. In the embodiment shown in FIG. 4, the brackish concentrate received at the wastewater plant 25 through pipes 41, 42 may be mixed together in mixer 114. A portion or all of the combined brackish concentrate may then be input to the mixer 116. The seawater concentrate from the seawater desalination plant 25 or mixed concentrate is provided to the mixer 116 via pipe 105. Wastewater from one or more municipalities 13 or other locations is sent to the wastewater treatment plant via pipe 130. The wastewater is treated in one or more wastewater treatment units 118, which may include methods such as screening, sedimentation, activated sludge, surface-aerated basins, filter beds, oxidizing beds, biological aerated filters, membrane bioreactors, rotating biological contactors, filtration, lagooning, nutrient removal, nitrogen removal, phosphorus removal, disinfection, and the like. The treated wastewater may then be sent to mixer 116, where it is mixed with one or more of brackish concentrate, mixed concentrate, seawater concentrate, and seawater. The mixed wastewater is then output from the wastewater treatment plant 25 through line 107 and output to the ocean 71 or other body of water through outlet 96.

The above description and drawings are only to be considered illustrative of specific embodiments, which achieve the features and advantages described herein. Modifications and substitutions for specific conditions and materials can be made. Accordingly, the embodiments are not considered as being limited by the foregoing description and drawings, but is only limited by the scope of the appended claims.

What is claimed as new and desired to be protected by Letters Patent of the United States is:

1. A method for releasing water into the environment, the method comprising the steps of:
heating a first flow of salty water;
generating concentrate from a water desalination plant by desalinating the heated first flow of salty water;
obtaining a second flow of salty water;
obtaining treated wastewater from a wastewater treatment plant;
combining the concentrate with the second flow of salty water to form a mixed concentrate;
combining the mixed concentrate and treated wastewater; and
releasing the combined mixed concentrate and treated wastewater into a body of water.

2. The method of claim 1, wherein the combined mixed concentrate and treated wastewater has a salinity such that the combined mixed concentrate and treated wastewater is less harmful to the environment of the body of water than the treated wastewater alone.

3. The method of claim 1, wherein heating the first flow of salty water occurs in a power plant cooling system.

4. The method of claim 1, wherein the concentrate is produced by desalinating the heated first flow of salty water using reverse osmosis.

5. The method of claim 1, wherein the concentrate is produced by desalinating the heated first flow of salty water using a thermal desalination process.

6. The method of claim 1, wherein the mixed concentrate and treated wastewater are combined in a specific proportion that causes the combined mixed concentrate and treated wastewater to be less toxic to at least some resident marine life than the treated wastewater alone.

7. The method of claim 1, wherein the combined mixed concentrate and treated wastewater is released into an ocean.

8. The method of claim 1, further comprising controlling the proportion of mixed concentrate to treated wastewater such that the ratio of each of the one or more ions selected from the group consisting of calcium, magnesium, fluoride, strontium, sodium, chloride, potassium, sulfates, and bicarbonates to the total dissolved solids is less toxic to at least some resident marine life than the treated wastewater alone.

9. The method of claim 1, wherein the water desalination plant is a coastal desalination plant.

10. The method of claim 1, wherein the wastewater is treated at the wastewater treatment plant by at least one method selected from the group consisting of screening, sedimentation, activated sludge, surface-aerated basins, filter beds, oxidizing beds, biological aerated filters, membrane bioreactors, rotating biological contactors, filtration, lagooning, nutrient removal, nitrogen removal, phosphorus removal, and disinfection.

11. The method of claim 1, wherein the mixed concentrate and treated wastewater are combined at the wastewater treatment plant.

12. The method of claim 1, wherein the treated wastewater has a salinity content that is lower than the salinity content of the body of water into which the combined mixed concentrate and treated wastewater is to be released and wherein the mixed concentrate has a salinity content that is higher than the salinity content of the body of water into which the combined mixed concentrate and treated wastewater is to be released.

13. The method of claim 1, wherein the mixed concentrate and treated wastewater is combined in a specific proportion that causes the salinity of the combined mixed concentrate and treated wastewater to be closer in salinity to the salinity of the body of water than the salinity of the treated wastewater alone.

14. A system for disposing of treated wastewater comprising:
a first mixer for mixing a mixed concentrate salty water and a treated wastewater;
a salty water desalination plant comprising:
an input coupled to a source of heated salty water,
a desalination unit for desalinating the heated salty water to produce a permeate having a lower salt concentration than the heated salty water and a concentrate having a higher salt concentration than the heated salty water,
a second mixer for mixing the concentrate and a second source of salty water to form the mixed concentrate salty water, and
an output coupled to the first mixer for outputting at least a portion of the mixed concentrate salty water to the first mixer; and
a wastewater treatment plant comprising:
an input coupled to a source of wastewater,
a wastewater treatment process, and
an output coupled to the first mixer.

15. The system of claim 14, further comprising a power plant coupled to first input of the salty water desalination plant for providing the heated salty water to the salty water desalination plant.

16. The system of claim 14, wherein the first mixer comprises a proportioning mechanism to control the ratio of mixed concentrate salty water to treated wastewater such that the combined mixed concentrate and treated wastewater is less toxic to at least some resident marine life than the treated wastewater alone.

17. The system of claim 14, wherein the a desalination unit comprises a reverse osmosis membrane.

18. The system of claim 14, wherein the first mixer comprises an output coupled to a body of salty water.

19. The method of claim 1, wherein the water desalination plant is a seawater desalination plant.

20. The method of claim 1, wherein the water desalination plant is a brackish water desalination plant.

21. A method for releasing water into the environment, the method comprising the steps of:
obtaining concentrate from a water desalination plant by desalinating salty water;
obtaining treated wastewater from a wastewater treatment plant;
combining the concentrate and treated wastewater; and
releasing the combined concentrate and treated wastewater into a body of water,
controlling the proportion of concentrate to treated wastewater such that the ratio of each of the one or more ions selected from the group consisting of calcium, magnesium, fluoride, strontium, sodium, chloride, potassium, sulfates, and bicarbonates to the total dissolved solids is less toxic to at least some resident marine life than the treated wastewater alone.

22. The method of claim 1, wherein the second flow of salty water is from a pretreatment unusable water line.

23. The method of claim 1, wherein the second flow of salty water is from seawater.

24. The method of claim 23, where the second flow of salty water is from a diverting pipe.

25. The method of claim 1, wherein the second flow of salty water is from a brackish water source.

26. The method of claim 8, wherein controlling the proportion of mixed concentrate to treated wastewater is performed automatically.

27. The method of claim 8, wherein controlling the proportion of mixed concentrate to treated wastewater is performed manually.

* * * * *